(12) United States Patent
Srivastava et al.

(10) Patent No.: US 8,826,367 B2
(45) Date of Patent: Sep. 2, 2014

(54) ELASTIC RESOURCE PROVISIONING IN AN ASYMMETRIC CLUSTER ENVIRONMENT

(75) Inventors: Ajay Kumar Srivastava, Fremont, CA (US); Anil Kumar Goel, Waterloo (CA)

(73) Assignee: Sybase, Inc., Dublin, CA (US)

( * ) Notice: Subject to any disclaimer, the term of this patent is extended or adjusted under 35 U.S.C. 154(b) by 98 days.

(21) Appl. No.: 13/104,184

(22) Filed: May 10, 2011

(65) Prior Publication Data

US 2012/0291088 A1    Nov. 15, 2012

(51) Int. Cl.
*G06F 9/50* (2006.01)
(52) U.S. Cl.
CPC .................................. *G06F 9/5072* (2013.01)
USPC .............................................. 726/1; 713/170
(58) Field of Classification Search
None
See application file for complete search history.

(56) References Cited

U.S. PATENT DOCUMENTS

| | | | |
|---|---|---|---|
| 6,782,410 | B1 | 8/2004 | Bhagat et al. |
| 8,214,823 | B2 * | 7/2012 | Tsuchiya et al. ............... 717/171 |
| 2004/0267897 | A1 | 12/2004 | Hill et al. |
| 2007/0271570 | A1 | 11/2007 | Brown et al. |
| 2009/0037367 | A1 | 2/2009 | Wein |
| 2009/0217385 | A1 * | 8/2009 | Teow et al. ...................... 726/27 |
| 2009/0247124 | A1 * | 10/2009 | de Atley et al. ............... 455/410 |
| 2010/0161897 | A1 * | 6/2010 | Lee et al. ........................ 711/112 |
| 2011/0019715 | A1 * | 1/2011 | Brisebois ....................... 375/130 |

OTHER PUBLICATIONS

Kristal t. Pollack, A Scalable Self-Evolving Performance Management Framework for Storage System, 2006, 26th IEEE International Conference.*
Amirali Baniasadi, Asymmetric-frequency clustering: a power-aware back-end for high-performance processors, ISBN:1-58113-475-4 , ISLPED '02 Proceedings of the 2002 international symposium on Low power electronics and design.*

* cited by examiner

*Primary Examiner* — Kambiz Zand
*Assistant Examiner* — Gita Faramarzi
(74) *Attorney, Agent, or Firm* — Sterne Kessler Goldstein & Fox P.L.L.C.

(57) ABSTRACT

System, method, computer program product embodiments and combinations and sub-combinations thereof for elastic resource provisioning are provided. An embodiment includes grouping physical resources in an asymmetric distributed cluster of data processing nodes logically into one or more provisions. Further included are configuring access to the physical resources with the one or more provisions, and managing adjustment of operations among the data processing nodes in correspondence with adjustment to the physical resources through the one or more provisions and transparently to an application utilizing the physical resources.

20 Claims, 4 Drawing Sheets

ELASTIC RESOURCE PROVISIONING IN AN ASYMMETRIC CLUSTER ENVIRONMENT

BACKGROUND

1. Field of the Invention

The present invention relates to information processing environments and, more particularly, to elastic resource provisioning in an asymmetric cluster environment.

2. Background Art

Computers are very powerful tools for storing and providing access to vast amounts of information. Computer databases are a common mechanism for storing information on computer systems while providing easy data access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level.

In recent years, users have demanded that database systems be continuously available, with no downtime, as they are frequently running applications that are critical to business operations. In response, distributed database systems have been introduced to provide for greater reliability. Architectures for building multi-processor, high performance transactional database systems include a Shared Everything (SE) architecture, in which multiple processors of a single computer system share a common central memory and share the same set of disks, a Shared Nothing Cluster (SNC) in which neither memory nor any peripheral storage is shared among multiple compute systems, and a Shared Disk Cluster (SDC), in which multiple computer systems, each with a private memory share a common collection of disks. Each computer system in a SDC is also referred to as a Node, and all Nodes in the cluster communicate with each other, typically through private interconnects.

In general, Shared Disk Cluster database systems provide for transparent, continuous availability of the applications running on the cluster with instantaneous failover amongst servers in the cluster. When one system is down (e.g., for upgrading the CPU), the applications are able to continue to operate against the shared data using the remaining machines in the cluster, so that a continuously available solution is provided. Shared Disk Cluster systems also enable users to address scalability problems by simply adding additional machines to the cluster, without major data restructuring and the associated system downtime that is common in prior SMP (symmetric multiprocessor) environments.

Although Shared Disk Cluster database systems provide increased availability and reliability, they also introduce a number of new challenges. Among these challenges is that an SDC system is often used for running a wide variety of applications, each of which may have different workload profiles and resource requirements. SDC systems are subject to varied deployment requirements both in terms of the applications that users want to run on the cluster and how they want to run those applications. For example, one organization may want to run a single application across many nodes of a cluster, while another may want to use its cluster to consolidate and run several applications that were previously run on different machines on a single cluster node.

The demands placed by the applications on the cluster may also differ to a considerable agree in different deployment environments. For example, a cluster may host both an order entry application, which is write intensive, as well as a read-only application (e.g., an application serving up Web pages). A SDC may also host both mission critical production applications as well as lower priority applications (e.g., development or testing applications). Thus, there are many different ways that organizations may wish to utilize SDC systems. Organizations may, in fact, wish to deploy a combination of several of the different types of applications described above on a single cluster.

More and more, mission-critical systems, which store information on database systems, such as data warehousing systems, are run from such clusters. Data warehouse systems represent a type of database system optimized as a decision support system by tracking and processing large amounts of aggregate database information, the data warehouse. Data warehouses contain a wide variety of data that could be used to present a coherent picture of business conditions at a single point in time. Products exist for building, managing, and using a data warehouse, such as Sybase IQ available from Sybase, Inc. of Dublin, Calif.

Increasingly higher demands are being placed on database management systems to scale-out with increased hardware resources, particularly to support fast, ad hoc query processing in large data warehouse applications. A need exists for an approach for a database management system that supports efficient and flexible resource utilization adjusting elastically to physical resource adjustments and that meets the demands of differing deployment environments, e.g., a mixture of read-only and write intensive applications, mission critical production applications and lower priority applications, etc. The present invention addresses these and other needs.

BRIEF SUMMARY

Briefly stated, the invention includes system, method, computer program product embodiments and combinations and sub-combinations thereof for elastic resource provisioning. Included is the grouping of physical resources in an asymmetric distributed cluster of data processing nodes logically into one or more provisions. Further included are configuring access to the physical resources with the one or more provisions, and managing adjustment of operations among the data processing nodes in correspondence with adjustment to the physical resources through the one or more provisions and transparently to an application utilizing the physical resources.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
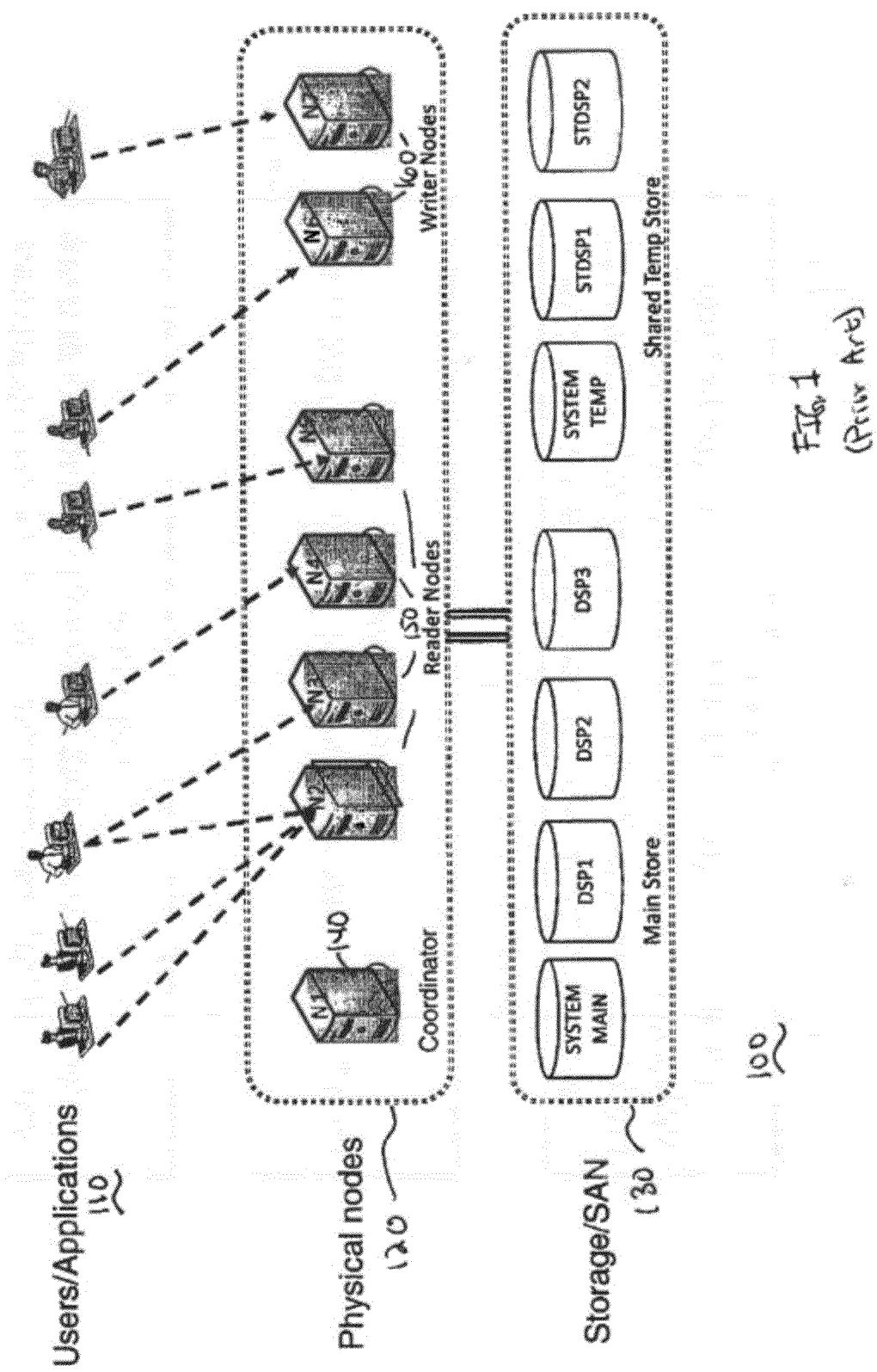
FIG. 1 illustrates an example of a prior art data warehousing environment that provides a clustered server configuration.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for elastic resource provisioning in an asymmetric cluster environment.

FIG. 1 illustrates an example 100 of a prior art data warehousing environment that provides an asymmetric clustered server configuration. For purposes of this description, an asymmetric clustered server configuration refers to an arrangement in which nodes of the cluster have differing capabilities, in contrast to symmetric arrangements, where each node has the same role and responsibility. As shown, concurrent data loads and queries from users/applications 110 are handled via independent data processing nodes 120 connected to shared data storage 130. By way of example, a configuration in which Sybase IQ, available from Sybase, Inc. of Dublin, Calif. is running on each node 120, provides a hybrid cluster architecture that involves shared storage for permanent data and independent node storage for catalog metadata, temporary data, and transaction logs.

In operation, shared database objects can be written by one user and queried by multiple users simultaneously. Many objects of this type may exist and be in use at the same time in the database. Further, a primary node, or coordinator 140, manages all global read-write transactions. The coordinator 140 further maintains a global catalog, with a table version log (TLV log) storing information about DDL (data definition language) operations, and communicates information about new table versions to the one or more secondary nodes. The secondary nodes may be designated as reader (read-only) nodes 150 and writer (read-write) nodes 160, with one secondary node designated as a failover node to assume the coordinator role if the current coordinator is unable to continue. The nodes that participate in the cluster share messages and data via Inter-node Communication (INC), which provides a TCPIP-based communication link between cluster nodes and includes heartbeat and pooled connections. Secondary nodes communicate with the coordinator via INC for DDL and global transactions, and the coordinator communicates with the secondary nodes via inter-node communication when certain stored procedures are executed on the coordinator. Further, peer-to-peer communication preferably occurs via a private interconnect configuration of the INC, however, if no private interconnect is configured, the peer-to-peer communication can share the public network configuration used for normal node connections.

The ability to arrange processing nodes in such an asymmetric cluster is considered beneficial in serving the needs of multiple applications, each of which can have its own SLA (service level agreement) requirement. As the market conditions and opportunities continue to change, a need exists to be able to adapt to the deployment of new applications, to support adjustment of resources assigned to existing applications, including prevention of resource underutilization, and the like. Heretofore, the flexibility to adjust dynamically to desired changes, such as to the physical resources (e.g., computing and storage capacity capabilities), in an elastic manner is not well-supported.

Figure 2:
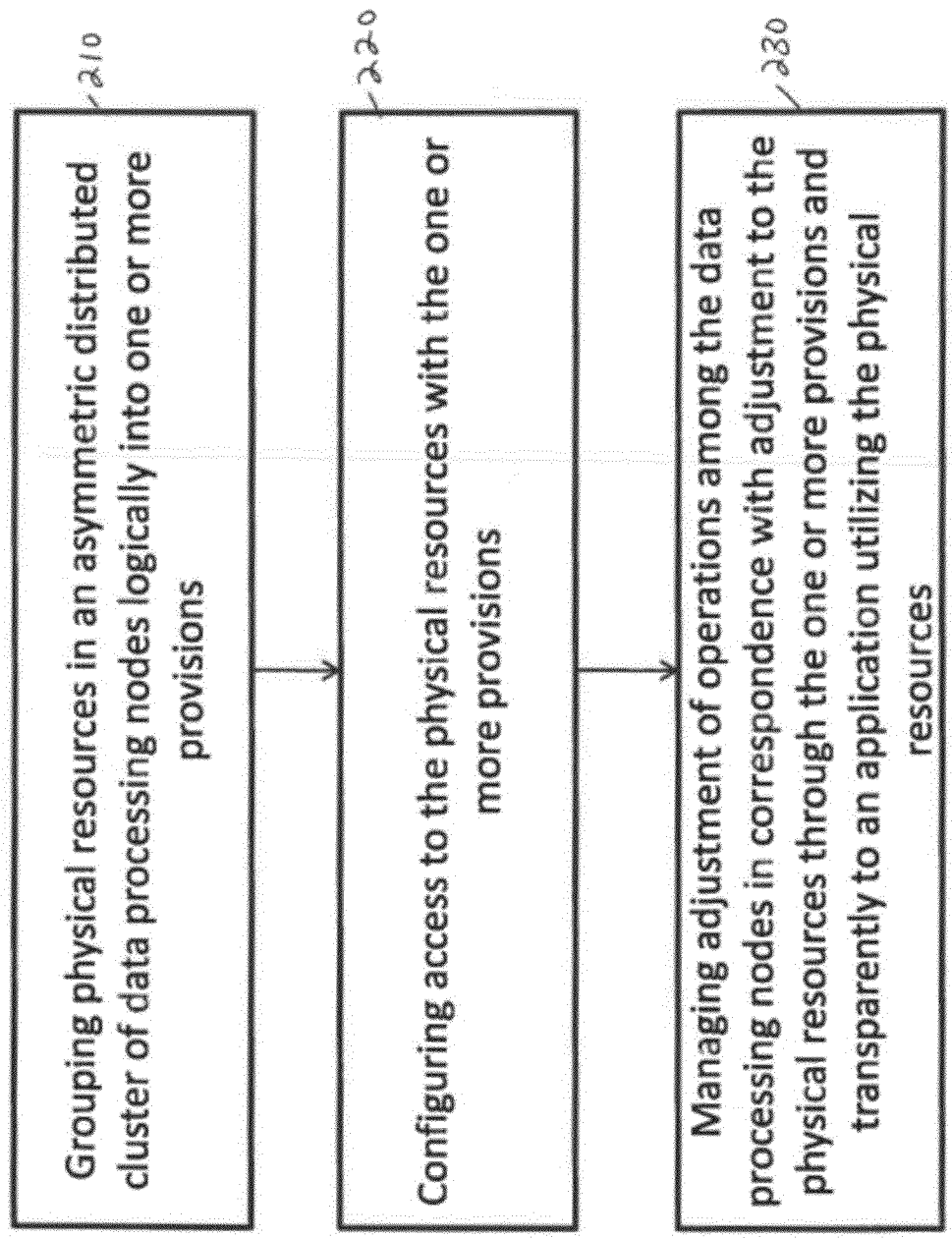
FIG. 2 illustrates a block diagram of an overall approach for elastic resource provisioning in a data warehousing environment in accordance with embodiments of the invention.
Figure 3:
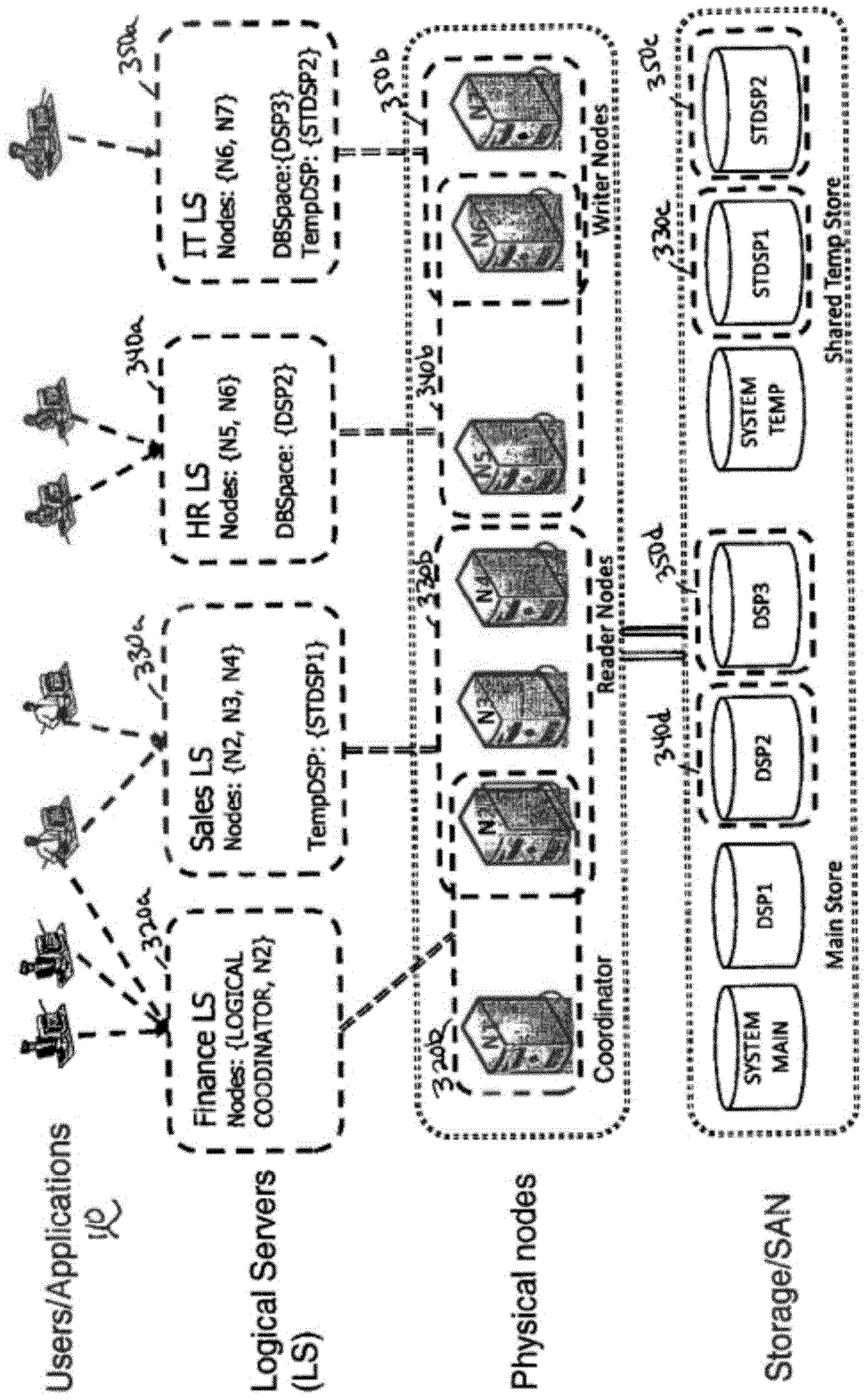
FIG. 3 illustrates a possible updated arrangement of the data warehousing environment of FIG. 1 resulting from application of the aspects of inventive embodiments of FIG. 2.

In accordance with an embodiment of the invention, FIG. 2 illustrates a block flow diagram of an overall approach for achieving such elasticity. The approach includes grouping physical resources in an asymmetric distributed cluster of data processing nodes logically into one or more provisions (block 210). For purposes of this description, a logical server refers to a logical entity comprised of compute resources and storage resources that can be provisioned for presentation as a single entity to external applications or users. By way of reference, compute resources refer to the physical nodes of the cluster providing computing power, while storage resources refer to database storage spaces of the shared data storage. Nodes assigned to a logical server are referred to as its members. A logical server can have both READER and WRITER nodes as members. As shown in FIG. 3, one possible updated arrangement of FIG. 1 associates the applications/users 110 with logical groupings of logical servers 320a, 330a, 340a, and 350a.

Once grouped, access to the physical resources is configured with the one or more provisions (FIG. 2, block 220), and adjustment of operations among the data processing nodes is managed in correspondence with adjustment to the physical resources through the one or more provisions and transparently to an application utilizing the physical resources (block 230).

In an embodiment, creation of a logical server is done via a DDL command, such as by using the following syntax:

```
CREATE LOGICAL SERVER ls-name [ MEMBERSHIP
    '(' ls-member, ... ')' ]
    ls-member:
        FOR LOGICAL COORDINATOR
        | server-name
```

By way of example, CREATE LOGICAL SERVER ls1, would create a logical server named 'ls1', while CREATE LOGICAL SERVER ls2 MEMBERSHIP (N1, N2, N3) would create a logical server named 'ls2' having nodes N1, N2, and N3 as its members. CREATE LOGICAL SERVER ls3 MEMBERSHIP (N3, FOR LOGICAL COORDINATOR) would create a logical server named 'ls3' with node N3 as its member. The current coordinator is also included in this example logical server 'ls3' by way of defining a logical membership to the coordinator using the clause 'FOR LOGICAL COORDINATOR'. A similar creation approach provides the logical server 320a (FIG. 3) that includes node 320b as its member and to also include the COORDINATOR node.

The logical membership of the coordinator into a logical server results in the coordinator always being available to the logical server as its member regardless of which node plays the coordinator role, where the coordinator role can move from one node to another due to coordinator failover. In an embodiment, when the coordinator failover occurs, and if the coordinator is a logical member of a logical server, the new coordinator node becomes an implicit member of the logical server regardless of the explicit logical server membership definitions that are based on node name identifiers.

Further, the logical server memberships that are defined using the node name to the current coordinator node are ineffective as long as that node plays the coordinator role. These logical server memberships become effective again when that node is no longer the current coordinator. In other words, the current coordinator node is available to only those logical servers that have the coordinator as its logical member, and not to those logical servers that have membership to the current coordinator node using the node name. If the current coordinator is a both a logical member as well as a named member of a logical server, then it will be available to the logical server but only by virtue of its logical membership. The named membership will still be considered ineffective.

One anticipated reason for choosing these semantics for the coordinator node membership is to ensure that there is some degree of predictability in terms of the workload on the coordinator. The described approach ensures that the coordinator is available to a known set of logical servers, which does not change as a coordinator fails over from one node to another.

By way of example, consider a cluster with three nodes, N1, N2 and N3, with an assumption of N1 as the current coordinator, with N2 and N3 as secondary nodes. Further, LS1 and LS2 have the following membership definitions: the coordinator is a logical member of LS1, N1 is a named member of LS2, N2 is a named member of LS2, and N3 is a named member of LS1 and LS2.

When N1 is the coordinator, the effective configuration for LS1 and LS2 is:
LS1: {N1, N3}. N1 is available to LS1 due to coordinator's logical membership.
LS2: {N2, N3}. N1 is unavailable to LS2 even though it is a named member of LS2.
If N1 fails and the coordinator is switched-over to N2, the effective configuration of LS1 and LS2 would change to:
LS1: {N2, N3}. Note that N2 becomes available to LS1 due to coordinator's logical membership.
LS2: {N3}. N2 is no longer available to LS2 because N2 is the current coordinator and named memberships to the current coordinator are not effective.
Further, if N1 is brought back up again, now as a secondary node, then effective configuration of LS1 and LS2 would become:
LS1: {N2, N3}. N1 is not a named member of LS1, so there are no changes for LS1.
LS2: {N1, N3}. N1 now becomes available to LS2 due to its named membership. N1 is no longer the current coordinator, so all named memberships for N1 are effective again. In other words, the current coordinator is only available to LS1 regardless of the node (N1 or N2) playing the coordinator role.

For each logical server, a logical server policy governs/affects its behavior in certain ways via a set of configurable options. In an embodiment, either a built-in ROOT logical server policy can be applied or a user-defined logical server policy can be applied. Further, a single logical server policy can be assigned to more than one logical server. When a logical server is not explicitly associated with a logical server policy, or options of a logical server policy are not explicitly defined, then implicit association with the ROOT logical server policy occurs. A DDL command, such as CREATE LS POLICY, supports creation of user defined logical server policies, e.g.,

```
CREATE LS POLICY policy-name option-value-list
    option-value-list:
        { option-name = value }...
``` where policy-name can be any identifier except ROOT, and option-value-list is the option-value pair(s) whose value will get modified for the new policy. By way of example, options can include an option to 'ALLOW COORDINATOR_AS_MEMBER=[ON|OFF]' and 'LOGIN_REDIRECTION=[ON|OFF]'. The provision of the 'ALLOW COORDINATOR AS MEMBER PROPERTY' is considered to be able to accommodate many situations. With a default setting to 'ON', the coordinator would be eligible to participate in any user defined logical server. Further, if a logical membership of the coordinator is defined into a logical server, and this property is changed to 'OFF', the coordinator is effectively removed from the logical server.

For example, a cluster deployment that includes only a few (2-4) very powerful physical nodes may want to allow the coordinator node to be also available to one or more logical servers as a member node to process their normal work-load. On the other hand, a deployment with scores of nodes (e.g., using blade servers or commodity hardware) may want to spare the coordinator node from the workload of logical servers.

In an embodiment, the parameters, properties, and/or configuration information associated with the logical servers are stored in system catalog(s), as is known in the art. The internally (in-memory) maintained current state of the logical server configuration on each node is referred to as the effective logical server configuration. The effective logical server configuration is essentially a function of static logical server configuration and dynamic state of the cluster. For example, changes can occur in response to events, such as a node coming up or going down, logical server configuration changes, cluster configuration changes, such as nodes being included/excluded from the cluster, coordinator failover, changes in other settings and options, etc.

Access to cluster nodes is configured in terms of logical servers. Such logical server access configuration is specified in the user's login policy A user's login policy refers to a set of rules that are applied when a user or group connection is made to the node and is in addition to the user-name/password authentication that happens during the login process, as is well understood in the art. When a user-defined login policy has no logical server access configuration of its own, it inherits the logical server access configuration of the ROOT login policy. Each connection to a node operates under a single logical server context.

In an embodiment, the context is determined automatically based upon a user's login policy and its logical server access configuration. To automatically determine whether a connection should be accepted or rejected, the user's login policy is examined to identify the list of assigned logical servers from the user's login policy. Next, a determination is made as to whether the current node of the connection attempt is an effective member of any one of these logical servers assigned. If it is a member, the connection is accepted with the unambiguously determined logical server as the logical server context of the connection. Otherwise, the connection is rejected.

To support automatic context determination, membership of logical servers assigned to a login policy cannot overlap, so that it is guaranteed that a node could be an effective member of at most one logical server from the list of assigned logical servers. Configuration checks are done to ensure that there is no membership overlap when more than one logical server is explicitly assigned to a login policy. For example, when a logical server membership change is made, such as when adding one or more member nodes, each login policy that allows access to the logical server is examined to ensure that the new membership does not cause an overlap with membership of other logical servers assigned to a login policy. Such a check suitably occurs upon the execution of a DDL command to change a logical server membership, which fails with an error if it may cause such membership overlap. It also is invoked when a login policy—logical server access configuration is done (or altered).

By way of example, altering node membership or a login policy—logical server access configuration can be done via a suitable DDL command, such as the following:

```
ALTER LOGIN POLICY policy-name {alter-clause}
alter-clause:
{
    { ADD | DROP | SET } LOGICAL SERVER ls-assignment-list
|   policy-option-name=policy-option-value [LOGICAL SERVER ls-override-list]
}
ls-assignment-list: {{ls-name, ...} | SERVER | NONE | DEFAULT}
ls-override-list: {ls-name, ...}
ls-name: { OPEN | user-defined-ls-name}
policy-option-value: {UNLIMITED | DEFAULT | value}
```

The ADD, DROP or SET clause provides a way to configure logical server assignment of a login policy, where the ADD clause adds a new logical server assignment to a login policy, the DROP clause deletes an existing logical server assignment from a login policy, and the SET clause replaces all existing logical server assignments for a login policy with the given logical server list. Preferably, only one 'alter-clause' is specified at a time, and SERVER, NONE, and DEFAULT are used with the SET clause only. An error is returned when any logical server specified with the ADD clause is already assigned to the login policy or any logical server specified with the DROP clause is currently not assigned to the login policy, or, as previously mentioned, the logical server assignment change may cause a membership overlap among assigned logical servers.

Each of the following examples assume that a 'root' login policy allows access to logical servers 'ls4' and 'ls5' and login policy lp1 exists with no logical server assignment. Effective logical server assignment of the login policy lp1 consists of logical server 'ls4' and 'ls5' and is denoted in the format lp1:{ls4, ls5}.

EXAMPLE 1

Assign Logical Server ls1 to Login Policy lp1

ALTER LOGIN POLICY lp1 ADD LOGICAL SERVER ls1
This changes lp1:{ls4, ls5} to lp1: {ls1}.

EXAMPLE 2

Also Allow Access of Logical Servers ls2 and ls3 from Login Policy lp1

ALTER LOGIN POLICY lp1 ADD LOGICAL SERVER ls2, ls3
This changes lp1:{ls1} to lp1:{ls1, ls2, ls3}.

EXAMPLE 3

Modify Login Policy lp1 to Allow Access to ls3 and ls4 Only

ALTER LOGIN POLICY lp1 ADD LOGICAL SERVER ls4
ALTER LOGIN POLICY lp1 DROP LOGICAL SERVER ls1, ls2
OR
ALTER LOGIN POLICY lp1 SET LOGICAL SERVER ls3, ls4
This changes lp1:{ls1, ls2, ls3} to lp1:{ls3, ls4}.

EXAMPLE 4

Modify Login Policy lp1 to not Allow Access to any Logical Servers

ALTER LOGIN POLICY lp1 SET LOGICAL SERVER NONE
This changes lp1:{ls3, ls4} to lp1:{ }

EXAMPLE 5

Drop Current Logical Server Assignments of Login Policy Lp1 and Allow It to Inherit the Logical Server Assignments of the Root Login Policy ALTER LOGIN POLICY lp1 SET LOGICAL SERVER DEFAULT
This changes lp1:{ } to lp1: {ls4, ls5}.

The use of automatic logical server context determination and the associated membership overlap check is considered unnecessary in an alternate embodiment, in which connection parameters are utilized to explicitly specify the target logical server and target server role, respectively, of a connection. For example, a parameter, LOGICALSERVER, can be utilized to explicitly specify the target logical server (e.g., the target logical server for a connection can be explicitly specified by setting a connection parameter LOGICALSERVER=<target-logical-server>). When LOGICALSERVER is not specified in the connection string, the effective setting of the option 'default logical server' in the user's login policy provides the target logical server context.

Another parameter, NODETYPE, can be utilized to specify a target server role (e.g., NODETYPE={READER|WRITER|ANY}). For example, applications that execute UDFs (user-defined functions) may specifically need to connect to a member node with the READER role, while applications that execute statements that modify data (such as INSERT, UPDATE, DELETE) may need to connect to a member node with the WRITER role. ANY is used for most read-only applications (that do not execute any UDF), which can connect to any member node of the logical server, and can also be used as a suitable target default when NODETYPE is not specified in the connection string.

As it may happen, a user may not always make the initial connection to a member node that satisfies the connection requirements of target LOGICALSERVER and target NODETYPE. If login redirection, as is well known in the art, is enabled and possible for a connection, then that connection may be redirected to another node that satisfies the connection requirements.

Typically, to use login redirection feature, client applications are required to link with the client libraries that include the client-side support for the login redirection, and the DBMS system needs to include suitable functionality.

Further, certain environments may support distributed query processing (dqp). An option may also be included in the login policy for use in designating whether such dqp is enabled or not. When enabled, a query submitted to a node from a connection that has the logical server context is allowed to have its execution distributed but only to those nodes that are effective members of the connection's logical server.

As mentioned previously, provisioning includes not only computing resources but storage resources, as well. Data distribution across multiple disks at the application level occurs by representing storage resources as DBSpaces (database storage space). DBSpaces can include both main and temporary (temp) storage space to support permanent and scratch data storage, such as for user data and internal database structures used for startup, recovery, backup, and transaction management, as is well appreciated by those skilled in the art. In accordance with an embodiment, one or more main DBSpaces can be assigned to a logical server for its exclusive use, which provides for enhanced data isolation and security for the logical servers in a multi-tenant environment.

In an embodiment, DBSpace assignment can be done in one of the two modes, EXCLUSIVE READWRITE, in which a main DBSpace (used primarily for storing user data) can be read or modified only from the context of the logical server to which it is assigned, or EXCLUSIVE WRITE, in which a main DBSpace can be modified only from the context of the assigned logical server, however, read operations on it are allowed from other logical server contexts as well. Main DBSpaces which are not exclusively assigned to a logical server can be read or written from any logical server context and such DBSpaces collectively make up what is referred to as the public DBSpace pool.

DBSpaces that are exclusively assigned to a logical server can be released back into public DBSpace pool by dropping their exclusive assignment. Most commonly, exclusively assigned DBSpaces of a logical server will be released empty when a logical server is being dropped. However, there might be situations that require that data that is created by the logical server in its exclusive DBSpaces is retained while the logical server itself is dropped. To support such a situation, exclusive DBSpaces can be released NON-EMPTY as well, but an intent for their NON-EMPTY release must be explicitly expressed in the logical server configuration (an example syntax for which is presented herein below).

In an embodiment, temp DBSpace assignment to a logical server is done in an implicit EXCLUSIVE mode, i.e., no read or write operations will be allowed from any other logical server context other than the assigned one. Further, in order to support dqp, temp DBSpace can be utilized to exchange intermediate result sets/data among nodes participating in the execution of a query. Preferably, assignment of more than one shared temp DBSpaces to a logical server is not allowed. By way of example, referring again to FIG. 3, for logical server 330a, nodes 330b are members, as well as temp DBSpace 330c, while logical server 340a includes nodes 340b as members, as well as main DBSpace 340d, and logical server 350a includes nodes 350b as members, as well as temp DBSpace 350c, and main DBSpace 350d.

With the use of DBSpaces, it is possible that different sub-objects, such as columns, indexes and partitions, etc., of an object can be placed into different DBSpaces. Certain rules are considered beneficial to ease control and access. For example, each object, if using exclusively assigned DBSpace(s) of a logical server, should be fully contained in either EXCLUSIVE READWRITE DBSpace set or EXCLUSIVE WRITE DBSpace set of the logical server. Further, the EXCLUSIVE READWRITE DBSpace set or EXCLUSIVE WRITE DBSpace set of a logical server should contain all DBSpaces that are exclusively assigned to the logical server in the EXCLUSIVE READWRITE or EXCLUSIVE WRITE mode, respectively. In this manner, a logical server context validation check can be done efficiently against the DBSpace of the base object alone regardless of what sub-object is being accessed. Besides the logical server context validation check, read or write access to objects is also subject to the current user's object level permission, as is well established in the art.

By way of example, consider tables T1 and T2 that reside in a DBSpace, DSP1, which is exclusively assigned to a logical server, LS1, in EXCLUSIVE READWRITE mode. Assume user, User1, has the necessary object level permissions to modify (INSERT/UPDATE/DELETE) table T1, but not T2. Also assume that User1's login policy allows access to logical servers LS1 and LS2. In the given example, User1 is allowed to perform read/write operation on table T1 from the logical server context of LS1 but cannot read/write on table T1 from the logical server context of LS2, even though the user has required object level permissions on table T1. This is because table T1's DBSpace, DSP1, cannot be read/written from the logical server context of LS2. Further, User1 cannot modify table T2 from the logical server context of LS1 even though table T2's DBSpace can be read/written from LS1, because User1 does not have required object level permission to modify table T2.

Control over data movement across DBSpaces also is subject to DBSpace assignment. For example, consider an arrangement with DBSpaces, DSP1 . . . DSP6, where DSP1 and DSP2 are exclusively assigned to the logical server LS1 in EXCLUSIVE READWRITE mode, DSP3 is exclusively assigned to the logical server LS1 in EXCLUSIVE WRITE mode, DSP4 is exclusively assigned to the logical server LS2 in EXCLUSIVE READWRITE mode, and DSP5 and DSP6 are not assigned to any logical server, i.e., they are public DBSpaces. Further, Tables T1, T2, T3 and T4 are created in DSP1, DSP3, DSP4, and DSP5 respectively.

In such an arrangement, any sub-object (column, index etc.) of T1 can only be moved to DSP2 (and back to DSP1). Moving it to DSP3 (assigned to the same logical server but in a different mode), DSP4 (assigned in the same mode but to another logical server) and DS5 (public DBSpace) results in an error. No sub-object of table T2 (and likewise T3) can be moved to another DBSpace, since there are no additional DBSpaces assigned to LS2 in the EXCLUSIVE READWRITE mode. Any sub-object of table T4 can only be moved among public DBSpaces DS5 and DSP6, causing an error if a move is attempted to an exclusively assigned DBSpaces DSP1 . . . DSP4. In this manner, these rules and controls ensure that each object residing in an exclusively assigned DBSpace remains fully contained in an EXCLUSIVE READWRITE or EXCLUSIVE WRITE DBSpace set of the logical server to which an object's DBSpace is exclusively assigned, and referential integrity of objects is enforced with minimal runtime overhead.

Designation of a chosen mode of assignment of a DBSpace suitably occurs through a DDL command syntax, such as the following 'CREATE LOGICAL SERVER' syntax, which also supports designation of other logical server features, as presented in the subsequent examples:

```
CREATE LOGICAL SERVER logical-server-name [ {ls-create-clause,
...} ]
ls-create-clause :
{
MEMBERSHIP ( {ls-member [SHARED | EXCLUSIVE], ...} )
| ASSIGN DBSPACE ({dbspace-name [EXCLUSIVE {READWRITE |
WRITE}], ...})
| {ALLOW | DENY} NON EMPTY DBSPACE RELEASE
| POLICY ls-policyname
| EXPIRE AT expiry-time
}
ls-member:
FOR LOGICAL COORDINATOR
| server-name
expiry-time: timestamp
```

By way of example,

```
CREATE LOGICAL SERVER ls1
ASSIGN DBSPACE dsp1,
    dsp2 EXCLUSIVE WRITE
ALLOW NON EMPTY DBSPACE RELEASE
POLICY lspolicy1
``` creates a user defined logical server, ls1, with no member nodes, main shared DBSpaces, dsp1 and dsp2, assigned in EXCLUSIVE READWRITE and EXCLUSIVE WRITE mode respectively, with logical server policy, lspolicy1, where the logical server ls1 will use public shared temp DBSpace, and the DBSpaces dsp1 and dsp2 can be released non-empty from the logical server. When assignment mode for a node or a dbspace is not specified, mode of SHARED and EXCLUSIVE READWRITE respectively are assumed by default.

As another example, assuming node n1 to be the current coordinator,

```
CREATE LOGICAL SERVER ls2
MEMBERSHIP FOR LOGICAL COORDINATOR EXCLUSIVE,
    n1 SHARED,
    n2 EXCLUSIVE,
    n3
ASSIGN DBSPACE dsp1 EXCLUSIVE READWRITE,
    dsp2 EXCLUSIVE WRITE,
    temp-dsp1
POLICY lspolicy2
EXPIRE AT 12-21-2012
``` creates a logical server, ls2, with the named membership of nodes n1 and n3 in SHARED mode, node n2 in EXCLUSIVE mode and logical membership of the coordinator in EXCLUSIVE mode. Further, the logical server policy of the logical server is set to lspolicy2, while an expiration time for the logical server is set to midnight of 21 Dec., 2012.

The use of the optional expiry time allows a provisioning of a logical server to be set only for a pre-determined period. When a logical server expires, the dynamic state (in-memory) of the logical server configuration is updated to mark the logical server and its logical server membership as expired. The nodes used by the memberships of the expired logical server are available for reassignment to another logical server, while exclusive DBSpaces of an expired logical server cannot be assigned to any other logical server. If the re-assignment of a node to another logical server is done in a mode that conflicts with the assignment mode of the expired logical server membership, then the catalog is updated (as part of the DDL) to mark the conflicting expired logical server membership as 'REASSIGNED'. However, if the assignment mode of a new logical server membership does not conflict with the expired logical server membership assignment mode, then the entry for expired logical server membership is kept as is.

If the expiry date of an expired logical server is reset, the following behavior is suitable. If no membership of the logical server is marked as REASSIGNED (in the catalog), the command to extend the expiry succeeds, and the dynamic state of the logical server configuration re-activates all its logical server memberships. If one or more memberships of the logical server is marked as REASSIGNED, then a check is made to see if there are other conflicting memberships. If a conflicting logical server membership is found, then the command to extend the expiry fails with an error indicating that one or more of the logical server members have been reassigned to other logical servers. If no conflicting logical server membership is found, the REASSIGNED status of the logical server membership is cleared, and the command to extend the expiry succeeds, with the dynamic state of the logical server configuration updated appropriately.

Dynamically changing the logical groupings, e.g., adding new nodes, dropping existing nodes, etc., accommodates the changing resource needs of applications. By way of example, another DDL command syntax, 'ALTER LOGICAL SERVER', can be used to alter a logical server, e.g.,:

```
ALTER LOGICAL SERVER logical-server-name {alter-ls-clause, ...}
alter-ls-clause:
{
ADD MEMBERSHIP ({ls-member [EXCLUSIVE | SHARED], ...})
| DROP MEMBERSHIP ({ls-member, ... })
| ASSIGN DBSPACE ({dbspace-name [EXCLUSIVE {READWRITE |
WRITE}], ...})
| RELEASE DBSPACE {ALL [ EXCLUSIVE {READ WRITE |
WRITE}]
        | {dbspace-name, ...}}
| {ALLOW | DENY} NON EMPTY DBSPACE RELEASE
| POLICY policyname
| EXPIRE {NOW | AT expiry-time]
}
ls-member:
    FOR LOGICAL COORDINATOR
    | server-name
expiry-time: timestamp
    By way of example,
    ALTER LOGICAL SERVER ls1
    ADD MEMBERSHIP n1 SHARED,
        n2 EXCLUSIVE
    ASSIGN DBSPACE dsp1, dsp2,
        dsp3 EXCLUSIVE WRITE,
        temp-dsp1
    ALLOW NON EMPTY DBSPACE RELEASE
    POLICY lspolicy1
``` alters logical server, ls1, to add member nodes n1 in SHARED MODE and n2 in EXCLUSIVE MODE, assigns main shared DBSpaces dsp1, dsp2 in EXCLUSIVE READWRITE and dsp3 in EXCLUSIVE WRITE mode, assigns shared temp DBSpace, temp-dsp1, changes the existing logical server policy to lspolicy1, and allows main DBSpaces to be released non empty.

By way of further example,

```
ALTER LOGICAL SERVER ls1
DROP MEMBERSHIP n1, n2
RELEASE DBSPACE ALL
EXPIRE NOW
``` drops logical server membership of nodes n1 and n2, releases all main DBSpaces as well as assigned shared temp DBSpace, if any, and expires the logical server immediately.

In addition to altering a logical server, entire logical servers could be dropped, e.g., using a DDL command such as, DROP LOGICAL SERVER logical-server-name.

Further, in accordance with an embodiment, certain logical servers are built-in and have a membership that is implicitly defined, i.e., their membership information is never stored into the system catalog.

For example, a built-in 'OPEN' logical server has implicit membership to those nodes which are not a part of any user defined logical server. The membership of the OPEN logical server changes implicitly when nodes are added or dropped to/from user defined logical servers, and it may be empty of nodes. Several situations may be supported by inclusion of an OPEN logical server. For example, in a large deployment, while it is likely to have some applications which require provisioning of their own resources, it is also likely that there are other applications which are used only in an ad hoc manner and may not require dedicated resources to be provisioned for them. All such ad hoc applications can be served by OPEN logical server without having to create user defined logical servers for such applications. Further, the inclusion of an OPEN server allows for the option of not defining specific logical servers while still utilizing a provisioned cluster arrangement, with an OPEN logical server initially providing access to all nodes.

As another example, a built-in logical server, 'SERVER', includes only the current login node (i.e., the node where a connection is initially made). The SERVER logical server primarily provides a means for certain privileged users (e.g., a database administrator (DBA)) to connect to any node for carrying out server-level administrative tasks without requiring knowledge of the logical server(s) that a particular node is a member of. Yet another example of a built-in logical server, 'COORDINATOR', includes only the current coordinator node to facilitate client connections without requiring knowledge of the name of the current coordinator. This is considered particularly helpful, since a coordinator role can move from one node to another.

In a further embodiment, resources assigned to a logical server can be measured, such as to help chargeback at the logical server level. For example, metering information for a logical server can be obtained for any time-window during which logical server configuration is valid, e.g., an aggregate of node hours for all the member nodes of a logical server, an aggregate of configured CPU-core hours, an aggregate of up-time node hours and/or CPU-core hours of each member node, sum total of exclusively assigned shared main DBSpaces of a logical server in GB (Gigabyte) hours, sum total of memory available to logical server in GB hours, aggregate total of number of connections made to a logical server, and/or aggregate elapsed time in hours for all the completed and active connections of a logical server.

Figure 4:
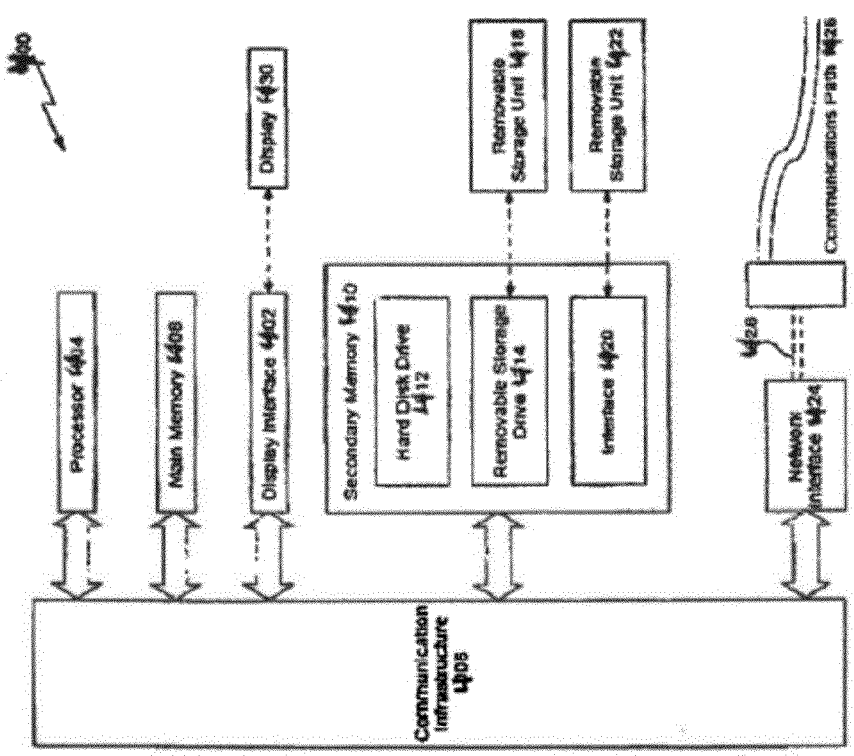
FIG. 4 illustrates an example computer useful for implementing components of embodiments of the invention.

Various aspects of the present invention can be implemented by software, firmware, hardware, or a combination thereof. FIG. 4 illustrates an example computer system 400, such as capable of acting as the nodes in the cluster of FIGS. 1, 3, in which the present invention, or portions thereof, can be implemented as computer-readable code. For example, the methods illustrated by flowchart of FIG. 2 can be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Signals carried over communications path 426 can also embody the logic described herein. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the method illustrated by the flowchart of FIG. 2. Accordingly, such computer programs represent controllers of the computer system 400. Where the invention is implemented using software, the software may be stored in a computer program product and loaded into computer system 400 using removable storage drive 414, interface 420, hard drive 412 or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While the invention is described in some detail with specific reference to a preferred embodiment and certain alternatives, there is no intent to limit the invention to that particular embodiment or those specific alternatives. Further, the description presents methods that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). Those skilled in the art will appreciate that modifications may be made to the preferred embodiment without departing from the teachings of the present invention.

What is claimed is:

1. A method for elastic resource provisioning, the method comprising:
    grouping physical resources in an asymmetric distributed cluster of data processing nodes logically into one or more provisions, a provision comprising at least one data processing node, and a data processing node providing at least one of computing resources and storage resources;
    configuring access to the physical resources with the one or more provisions; and
    managing adjustment of operations among the data processing nodes in correspondence with adjustment to the physical resources through the one or more provisions and transparently to a plurality of applications utilizing the physical resources simultaneously, wherein the adjustment to the physical resources comprises dynamically changing logical grouping of the cluster of the data processing nodes to support changing resource needs of the plurality of applications.

2. The method of claim 1 further comprising controlling whether a connection attempt to a data processing node is allowed based upon a login policy.

3. The method of claim 2 wherein an allowed connection comprises a data processing node of a provision associated with the login policy.

4. The method of claim 3 further comprising determining a logical server context automatically based upon the login policy and an included logical server access configuration.

5. The method of claim 4 further comprising examining the login policy to identify a list of assigned logical servers, and determining whether the data processing node is an effective member of any one from the list to control acceptance of the connection.

6. The method of claim 2 wherein the connection attempt specifies the provision to be connected to and is redirected to a node in the specified provision if needed.

7. The method of claim 1 wherein managing adjustment further comprises regulating the storage resources in correspondence with the one or more provisions.

8. The method of claim 7 further comprising assigning one or more logical portions of the storage resources exclusively to a provision with a chosen mode.

9. The method of claim 8 further comprising creating and fully containing an object within one or more exclusively assigned portions of a same mode of a provision, wherein referential integrity of objects is enforced with minimal runtime overhead and access to objects occurs without requiring logical server context validation on each sub-object.

10. The method of claim 9 further comprising controlling release of empty and non-empty storage resources.

11. The method of claim 1 wherein managing adjustment further comprises managing expiration designation of one or more provisions.

12. An elastic resource provisioning system, the system comprising:
    storage; and
    a plurality of data processing nodes coupled to the storage as an asymmetric distributed cluster arrangement having physical resources grouped logically into one or more provisions, a provision comprising at least one data processing node, and a data processing node providing at least one of computing resources and storage resources, the one or more provisions for configuring access to the physical resources and for managing adjustment of operations among the data processing nodes in correspondence with adjustment to the physical resources and transparently to a plurality of applications utilizing the physical resources simultaneously, wherein the adjustment to the physical resources comprises dynamically changing logical grouping of the data processing nodes to accommodate changing resource needs of the plurality of applications.

13. The system of claim 12 wherein an allowed connection to a data processing node comprises a data processing node of a provision associated with a login policy.

14. The system of claim 13 wherein an allowed connection operates according to a logical server context.

15. The system of claim 12 wherein managing adjustment further comprises regulating storage resources in correspondence with the one or more provisions.

16. The system of claim 15 wherein the provision comprises one or more logical portions of the storage resources exclusively assigned with a chosen mode with full object containment within one or more of the portions of a same mode for objects created within the one or more portions, wherein referential integrity of objects is enforced with minimal runtime overhead and access to objects occurs without requiring logical server context validation on each sub-object.

17. A non-transitory computer-usable medium having instructions recorded thereon that, if executed by a computing device, cause the computing device to perform a method comprising:
    grouping physical resources in an asymmetric distributed cluster of data processing nodes logically into one or more provisions, a provision comprising at least one data processing node, and a data processing node providing at least one of computing resources and storage resources;

configuring access to the physical resources with the one or more provisions; and managing adjustment of operations among the data processing nodes in correspondence with adjustment to the physical resources through the one or more provisions and transparently to a plurality of applications utilizing the physical resources simultaneously, wherein the adjustment to the physical resources comprises dynamically changing logical grouping of the cluster of the data processing nodes to accommodate changing resource needs of the plurality of applications.

18. The non-transitory computer-usable medium of claim 17 further comprising controlling whether a connection attempt to a data processing node is allowed based upon a login policy.

19. The non-transitory computer-usable medium of claim 18 wherein an allowed connection comprises a data processing node of a provision associated with the login policy.

20. The non-transitory computer-usable medium of claim 17 wherein managing adjustment further comprises regulating storage resources in correspondence with the one or more provisions.

\* \* \* \* \*